E. MUELLER & W. R. McKENNEY.
CONDUIT FOR ELECTRIC WIRES.
APPLICATION FILED JAN. 14, 1913.
1,165,530.
Patented Dec. 28, 1915.
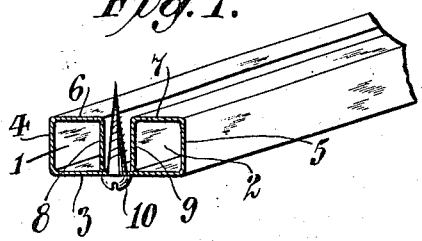
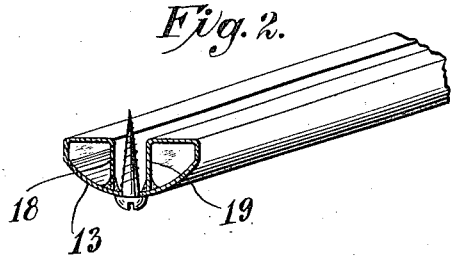
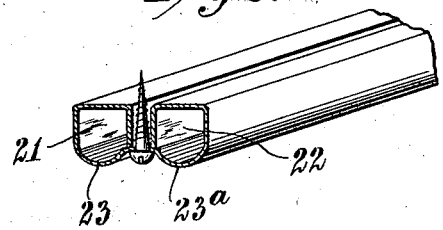
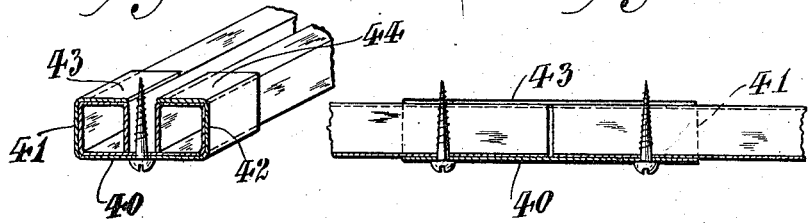
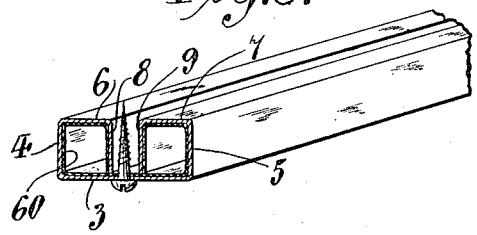
WITNESSES
INVENTORS
Ernest Mueller
Wm R. McKenney
BY
Frank H. Ashley
ATTORNEY

UNITED STATES PATENT OFFICE.

ERNEST MUELLER, OF STATEN ISLAND, AND WILLIAM R. McKENNEY, OF NEW YORK, N. Y.

CONDUIT FOR ELECTRIC WIRES.

1,165,530.   Specification of Letters Patent.   Patented Dec. 28, 1915.

Application filed January 14, 1913. Serial No. 741,933.

*To all whom it may concern:*

Be it known that we, ERNEST MUELLER and WILLIAM R. McKENNEY, citizens of the United States, residing, respectively, at Staten Island, in the county of Richmond and State of New York, and at New York city, borough of Brooklyn, in the county of Kings and State of New York, have invented certain new and useful Improvements in Conduits for Electric Wires, of which the following is a full, clear, and exact specification.

This invention relates to conduits for electric wires, more particularly conduits inclosing two electric wires of opposite polarity.

The principal objects of the present invention are: to provide a sheet metal conduit of the above character in which the wires are spaced from each other in separate compartments; which can be attached to a ceiling or other support without the use of cleats or other external fastening means aside from the usual screws; and which withal is very simple and inexpensive to make.

Another object is to provide a conduit of all metal construction, so as to avoid the possibility of a fire in case of a short circuit.

A further object is to provide a simple form of coupling for connecting the ends of the abutting sections of the conduit.

Still further objects and advantages will appear more fully from the detailed description and the novel features of construction will be particularly pointed out in the claims.

In the drawing illustrating several forms in which the invention may be embodied, Figure 1 is a perspective view illustrating an entirely rectangular form of section for the spaced compartments. Fig. 2 illustrates a curved exterior simulating a molding. Fig. 3 illustrates a form having a double curve exterior surface. Fig. 4 is a perspective view, and Fig. 5 is a longitudinal section of a portion of the conduit illustrating a coupling device for uniting the ends of the meeting sections of the conduit. Fig. 6 is a perspective view illustrating the form shown in Fig. 1, provided with an insulating lining.

In the various embodiments of my invention, the conduit is made of sheet metal which may readily and cheaply be made in a comparatively simple metal bending machine.

Referring to the form illustrated in Fig. 1, the conduit consists of two spaced compartments 1 and 2, formed in a sheet metal casing, having the top portion 3, outer vertical walls 4 and 5, flat bottom walls 6 and 7, and stiff flat inner vertical walls 8 and 9 bent at right angles to the bottom walls and forming a sharp corner therewith. A unitary strip of sheet metal may be used, the edges of which are bent in, so as to abut the interior of the top 3 and forming inner spaced vertical walls 8 and 9, separating the compartments. The space between these latter walls may be utilized for the passage of screws 10 by which the conduit may be fastened to a ceiling or other support to which it is desired to attach the wires. It will, of course, be understood that any form of insulated electric wire may be passed through the compartments 1 and 2 of the conduit, and be held therein, protected from injury and concealed from view. The space between the inner vertical walls 8 and 9 serves a convenient location for the screws or other fastening devices, and thus the necessity for a cleat or other form of suspending device is obviated as the screws may be inserted directly through the mid-width of the conduit into the support.

The inner walls abutting the interior of the top 3 serve to reinforce the same, and as the top is fastened in place, it is clamped against these inner walls, and thus forming a rigid construction which is not readily mutilated.

By reason of the straight formation of the inner walls and their angular disposition with reference to the bottom portions forming a sharp corner therewith, these walls withstand impact and pressure to much greater advantage; thus, it is possible with our improved construction to use nails for securing the conduit to the wall or ceiling. An extra blow of the hammer will not injure the conduit, as the latter is sufficiently stiff, by reason of its novel construction, to withstand an ordinary blow. Also when screws are used, they may be tightly secured in place without fear of collapsing the channels or spreading the walls of the conduit.

In the construction illustrated in Fig. 2, the top 13 is arc shaped and thus may give the conduit the appearance of a molding.

It will be understood, of course, that any paint or other surfacing material may be applied to the exterior of the conduit, so as to give it a neat outward appearance. If desired, the interior vertical walls 18 and 19 may be soldered or otherwise attached to the interior of the top 13, as indicated in Fig. 2. This, however, in most cases will be found unnecessary.

In Fig. 3, the top is formed in two curves 23 and 23ª, one for each of the compartments 21 and 22. Otherwise the construction is the same as in the form illustrated in Fig. 1.

Figs. 4 and 5 illustrate a form of coupling which may be used for connecting two sections of the conduit. This coupling consists of a substantially rectangular shaped metal frame consisting of a top 40, two vertical walls 41 and 42, and two spaced bottom portions 43 and 44, leaving an open slot through which the fastening screws may pass. It will, of course, be understood that for the other forms of section of conduit, the coupling will have a corresponding section, so as to snugly embrace the conduit.

In the modification illustrated in Fig. 6, the interior of the conduit is lined with some non-conducting material 60 which may be applied to the sheet metal in the form of a paint or japan or in any other well-known manner. Otherwise the construction is the same as in the form illustrated in Fig. 1.

It will thus be seen that we have provided a conduit for electric wires which is very simple in construction and inexpensive to manufacture which may be readily fastened to a support without the use of external cleats or other special constructions for fastening and in which the wires are separately housed, so as to be out of contact with each other. In case the insulation of one of the wires accidentally gives way, so as to charge the conduit, the latter will be immediately grounded by reason of the connection of the screws to the support. By reason of the all metal construction of the conduit, the possibility of causing a fire in case of short circuit is avoided.

Our improved form of conduit also lends itself to a simple coupling of the abutting section such as illustrated.

By reason of the formation of the walls, the conduit is well braced, as the screw passes through the slot formed by the adjacent interior walls, the latter being close to the line of pressure exerted by the screw. Also the edges of the blank being turned inwardly and clamped as above indicated, will not become readily disengaged or bent, and, therefore, the integrity of the conduit is always preserved.

Having thus described our invention, we claim as new:

A conduit for electrical conductors comprising a plurality of walls bounding an inner compartment and an outer compartment on each side thereof and parallel thereto, a joint cover for said three compartments integral with the outer walls of said outer compartments, a flat bottom for each outer compartment integral with the outer and inner wall of its compartment and adapted to rest against a support, said inner walls being rectangularly disposed in respect to said bottoms and having their free edges adjacent to the inner face of said cover, and means engaging the outer face of and extending through said cover and said inner compartment, for forcing the inner face of said cover toward the free edges of said inner walls and securing said conduit to said support.

In testimony whereof, we affix our signatures, in presence of two witnesses.

ERNEST MUELLER.
WILLIAM McKENNEY.

Witnesses:
FRANK M. ASHLEY,
MINNIE S. MILLER.